Aug. 30, 1960  A. G. BADE  2,950,628
SPEED REDUCER
Original Filed Aug. 7, 1957  2 Sheets-Sheet 1
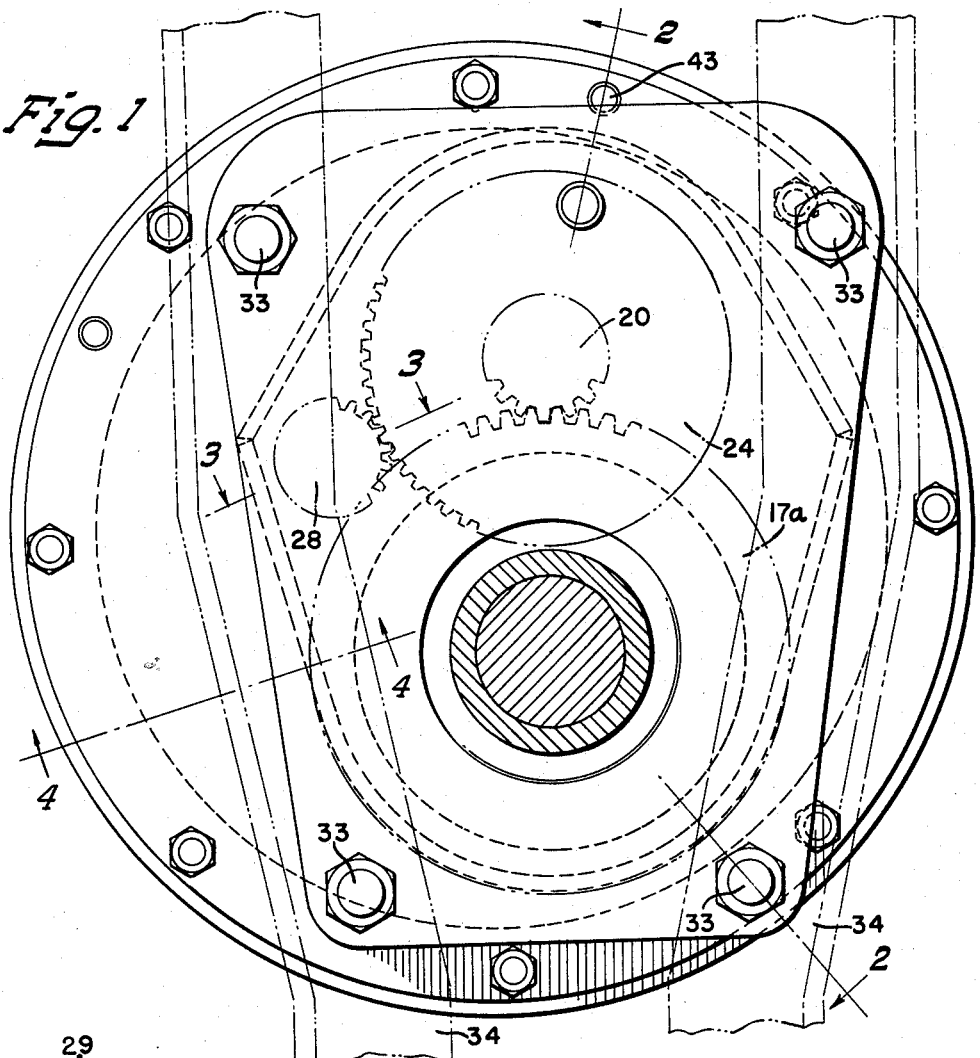
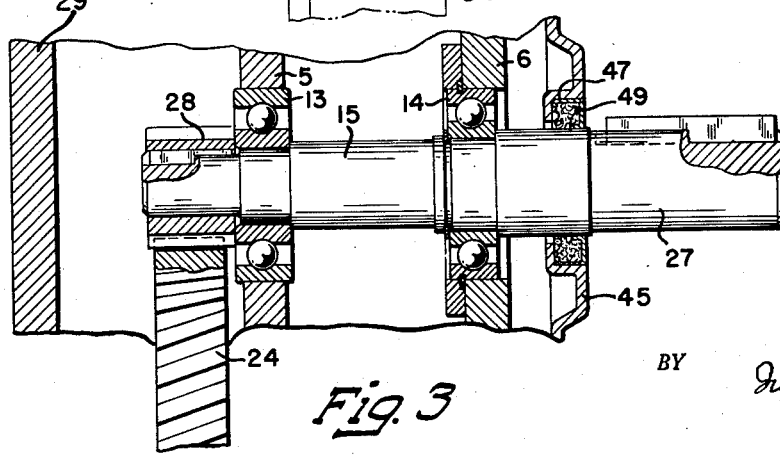
INVENTOR.
Alfred G. BADE
BY Quarles & French
Attorneys

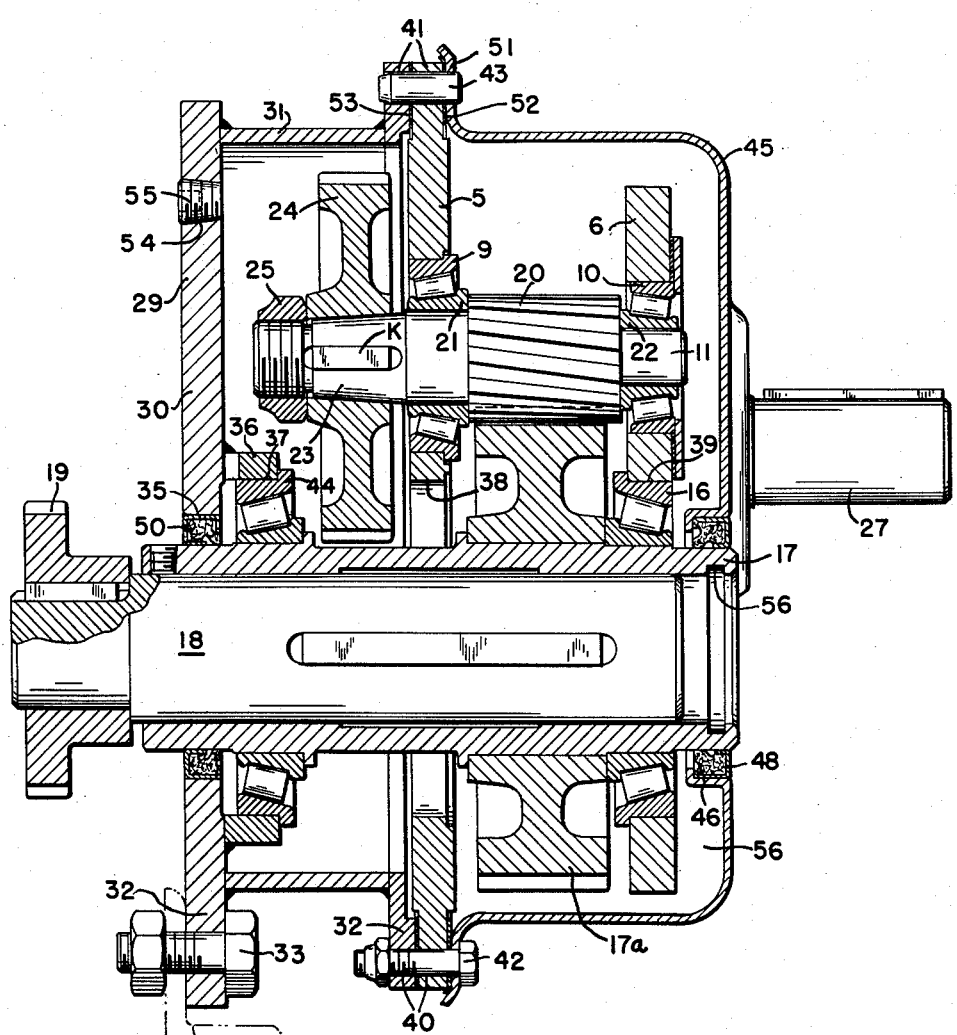
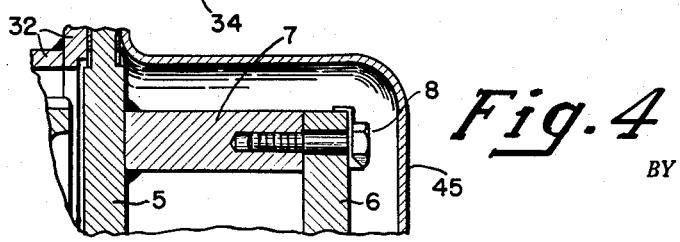

United States Patent Office 2,950,628
Patented Aug. 30, 1960

2,950,628
SPEED REDUCER

Alfred G. Bade, Brookfield, Wis., assignor to The Falk Corporation, Milwaukee, Wis., a corporation of Wisconsin Continuation of abandoned application Ser. No. 676,842, Aug. 7, 1957. This application Dec. 22, 1958, Ser. No. 782,327

3 Claims. (Cl. 74—421)

The invention relates to speed reducers.

The present application is a continuation of my copending application, Serial No. 676,842, filed on August 7, 1957, for Speed Reducer, now abandoned.

One object of the invention is to provide a speed reducer of the flange mounting type which adopts similar gear reduction principles shown in my prior U.S. Patent No. 2,762,232, dated September 11, 1956, and whereby the reduction gearing of this general type may be fixedly mounted on a frame wall or other fixture in a position for engagement of its output shaft with the input shaft of the mechanism to be driven by the incorporation therewith of an adapter which provides a flange mounting for the unit and a means for sustaining the gear carrying members of the unit against rotation about the shaft of the mechanism to be driven.

A further object is to provide a reduction gearing of the type above described having a flanged mounting adapter associated therewith and providing an additional mounting for the output shaft with an increased bearing span to increase bearing capacity to better sustain the over-hung loads.

Another object of the invention is to provide a speed reducer constructed to facilitate assembly of the gears and shafts therein and insure alignment of the supports for the shafts.

Another object of the invention is to provide a speed reducer which will permit ready inspection of the operating parts for accuracy and wear.

A further object of the invention is to provide a gear reducer of the type above described in which the adapter forms a housing section cooperating with one of the shaft carrying panels and a front cover section to form a reservoir to receive oil for lubricating the gears and shaft bearings.

The invention further consists in the several features hereinafter described and more particularly defined by the appended claims.

In the drawings:

Fig. 1 is a rear elevation view of a speed reducer embodying the invention;

Fig. 2 is a detailed vertical sectional view taken on the broken line 2—2 of Fig. 1;

Fig. 3 is a detailed vertical sectional view taken on the line 3—3 of Fig. 1;

Fig. 4 is a detailed vertical sectional view taken on the line 4—4 of Fig. 1.

Referring to the drawings, the speed reducer includes a shaft supporting frame formed by a pair of spaced metal bearing carrying panel members 5 and 6 extending parallel to each other, these members being bolted or otherwise releasably secured together, for example, by laterally disposed lugs welded to member 5, on the outer faces of which the member 6 is seated and secured by bolts, Fig. 4 showing one of the lugs 7 and a securing bolt 8, these members being suitably aligned with each other by dowels in a manner similar to similar panels of the aforementioned patent. The panel members 5 and 6 may be of circular form, the larger panel 5 being the main panel member and the panel 6 an auxiliary member.

Panel members 5 and 6 are provided with aligned bearings 9 and 10 for a shaft 11 and aligned bearings 13 and 14 for a power input shaft 15. Panel 6 has a bearing 16 to receive the outer end of a power output shaft 17 which is preferably of hollow form to receive the projecting end of the input shaft 18 of the mechanism to be driven, the shaft 17 being adapted to be keyed or otherwise attached to the shaft 18 to drive the same. Shaft 18 is shown as provided with a gear 19 for connection with other parts of the mechanism to be driven. All the shafts 11, 15 and 17 are disposed parallel to each other, the shafts 11 and 15 having their axes radially disposed relative to the axis of shaft 17.

The shaft 11 has a gear 20 formed integrally thereon and disposed directly between the bearings 9 and 10, and providing shoulders 21 and 22 to receive the inner races of said bearings and a tapered outer end 23 carrying a gear 24 detachably fixed to it by a key K and a clamping nut 25, said gear 20 being immediately adjacent panel 5 and meshing with a larger gear 17a suitably mounted on the shaft 17 immediately adjacent the bearing 16. The shaft 15 has a projecting outer end 27 formed to receive a drive element, such as a pulley or the like, extends through bearings 13 and 14, and is formed at its inner end for keyed connection with a small gear or pinion 28 meshing with the gear 24 and disposed closely adjacent the bearing 13.

An adapter 29 is in the form of a housing section formed of fabricated metal parts welded together to provide a shaft supporting rear auxiliary panel portion 30, sides 31 and an annularly flanged front pad 32 adapted to receive bolts 33 by which the reduction unit may be secured to supporting members 34 indicated in dotted lines in Fig. 1 and arranged in fixed relation with the shaft 18 to be driven, it being understood that the flanged rear panel portion 30 may be secured to any suitable fixed support 34 with which the shaft 18 of the mechanism to be driven is associated.

As shown in Fig. 2, shaft supporting panel portion 30 has an opening 35 and a bearing ring support 36 welded thereto with its inner surface 37 concentric with opening 35 and also concentric with an opening 38 in panel 5 and a bearing receiving bore 39 in panel 6 so that by the insertion of a suitable mandrel through these bores, the panel portion 30 is aligned parallel to the panels 5 and 6 and flanged face 32 can be brought in abutting relation with the outer portion of the panel 5 and holes, such as holes 40 and 41, bored through these abutting parts to receive bolts 42 and dowels 43, as indicated for a bolt and dowel shown in Fig. 2.

The bore 37 is adapted to receive the outer race of a bearing 44 whose inner race is mounted on the inner end of shaft 17.

A sheet metal stamping forms a front cover 45 which is provided with flanged openings 46 and 47 to receive suitable ring oil seals 48 and 49, and the opening 35 has a similar seal 50 for the inner end of shaft 17, the cover having a base flange 51 adapted to be clamped in position against the outer peripheral front face of the panel 5 by the bolts 42 and be aligned therewith by the dowels 43, there being sheet ring seals 52 and 53 interposed between the panel 5 and the flanges of the sections 45 and 29, thus forming an oil retainer reservoir which may be supplied with lubricating oil through any suitable opening, as for example, an opening 54 provided with a removable sealing plug 55.

With the above construction, power applied to shaft 15 to rotate the same is transmitted by the small gear 28 to the larger gear 24 on shaft 11 and from the smaller gear 20 to the larger gear 17a on shaft 17 to provide the desired speed reduction between the shafts 15 and 17 and consequently the shaft 18 to be driven.

As the housing section or adapter 29 is fixed to a fixed support adjacent the shaft to be driven and to the panel 5, it provides means for sustaining the gear carrying members of the unit against rotation about the shaft of the mechanism to be driven, and it also provides a support for the bearing 44 for the shaft 17 and thereby cooperates with the bearing 16 to provide an increased bearing span for the shaft 17 and therefore an increased capacity for this shaft to sustain the bearing loads imposed upon it by the gearing or external loads that may be imposed upon it by the mechanism to be driven. It also cooperates with the panel member 5 and cover 45 to form an oil reservoir 56.

In all prior speed reducer mechanisms, including the shaft supported reducer of the aforementioned Patent No. 2,762,232, the bearing span for the output shaft is no greater than that for the other shafts. In the present device, since the support panel 30 is spaced from the main panel 5 and the auxiliary panel 6 is spaced from the panel 5 and the bearings 16 and 44 for the output shaft 17 are mounted on the panels 30 and 6, the widely spaced bearings for the output shaft are spaced independent of the main panel 5 and act to isolate exterior thrust loads and radial loads from the center section which might influence the gear teeth and bearing alignment due to deflection of the case and shafting.

The placement of the bearing 44 on the panel 30, axially spaced from the panel 5 for additional support provides particular benefit when tapered bearings are used. It is well known that these bearings offer higher capacity compared to ball bearings and provide considerable savings in space. However, the inclined axial plane of the bearings subject the supporting shaft to cantilever load in the case of shaft hung or supported speed reducers, and the resultant load on the bearings resolves itself into an induced outward thrust tending to bulge or displace the panel members, which in turn introduces radial clearance between the shaft and bearings. Positioning of the bearing on the panel 30 thereby reduces the tendency to bulge and provides a relatively tight operating fit between the shaft and bearings. Thus, the three walled or panelled unit introduces additional capacity when compared to a two panel unit which is necessarily limited to an overhung load.

The present arrangement permits chain drive operation and feed screw operation, both of which introduce considerable torque load components in the shaft attached thereto. The present invention provides adequate support in such instances.

Removal of bolts 42 permits removal of the cover 45 and also permits a withdrawal of the front part of the unit relative to the fixed section 29 to inspect the normally housed gears, the shaft 17 being slidably removable with the inner race of bearing 44 for inspection of the condition of the gears.

The large main panel 5 and the smaller auxiliary panel 6, while here shown as formed of steel plates and fabricated lugs, may be formed of joined together castings. The driven shaft 17 adjacent its outer end is provided with a coupling tool engageable groove 56 to facilitate disengagement of shaft 17 from the shaft 18 if sticking occurs. This shaft 17 as shown in Fig. 2 preferably projects through the front face of the unit so that its outer end is readily accessible to the user in case a coupling puller is necessary and so that the user can sight down the shaft 17 when applying the unit to the shaft to be driven. The shaft 17 may, however, stop short of the front end of the housing and be covered by the front wall of the housing member 45 without departing from the spirit of the invention as defined by certain of the claims.

I desire it to be understood that this invention is not to be limited to any particular form or arrangement of parts except in so far as such limitations are included in the appended claims.

I claim:

1. In a speed reducer arranged for connection with the drive shaft of a machine to be driven and having a fixed support adjacent said drive shaft, the combination of an open frame construction comprising three laterally spaced rigidly interconnected shaft supporting panel members including a main panel member and first and second auxiliary panel members spaced at opposite sides thereof, a plurality of shafts journaled in said frame, gearing interconnecting said shafts, one of said shafts being a power input shaft, bearings for said input shaft mounted in said main and said first auxiliary panel members, said second auxiliary panel member arranged for rigid connection to said fixed support, another of said shafts being a power output shaft having a drive element mounted thereon and extending through said second auxiliary panel member, said main panel defining an aperture having its defining margin spaced from said output shaft, and bearings for said output shaft axially spaced from one another and respectively supported by said first and said second auxiliary panel members.

2. The speed reducer as defined in claim 1, wherein a lubricant housing is secured to one side of said main panel member and forms an enclosure for said first auxiliary panel member and the parts associated therewith and providing openings for receiving a respective projecting portion of said power input and said power output shaft, and a support and oil retainer housing intermediate of and rigidly secured to oppositely spaced sides of said main panel member and said second auxiliary panel member.

3. The speed reducer as defined in claim 2, wherein the first named and second named housings are provided with oil seals for said output shaft.

References Cited in the file of this patent

UNITED STATES PATENTS

| 2,504,066 | Christian | Apr. 11, 1950 |
| 2,762,232 | Bade | Sept. 11, 1956 |
| 2,801,548 | Bade | Aug. 6, 1957 |
| 2,813,435 | Schumb | Nov. 19, 1957 |